United States Patent
Fan et al.

(10) Patent No.: US 11,333,582 B2
(45) Date of Patent: May 17, 2022

(54) CONTROLLING A MOTORIZED MICROTOME

(71) Applicant: Leica Biosystems Nussloch GmbH, Nussloch (DE)

(72) Inventors: Zheguang Fan, Shanghai (CN); Xiaoqi Jiang, Shanghai (CN); Yunchao Yang, Shanghai (CN); Song Jin, Shanghai (CN); Xiang Liang, Shanghai (CN); Jinyu Xu, Shanghai (CN)

(73) Assignee: LEICA BIOSYSTEMS NUSSLOCH GMBH, Nussloch (DE)

( * ) Notice: Subject to any disclaimer, the term of this patent is extended or adjusted under 35 U.S.C. 154(b) by 149 days.

(21) Appl. No.: 16/626,895

(22) PCT Filed: Nov. 30, 2017

(86) PCT No.: PCT/CN2017/113802
§ 371 (c)(1),
(2) Date: Dec. 27, 2019

(87) PCT Pub. No.: WO2019/104585
PCT Pub. Date: Jun. 6, 2019

(65) Prior Publication Data
US 2020/0124502 A1    Apr. 23, 2020

(51) Int. Cl.
*G01N 1/06* (2006.01)

(52) U.S. Cl.
CPC ......... *G01N 1/06* (2013.01); *G01N 2001/066* (2013.01)

(58) Field of Classification Search
CPC ........................... G01N 1/06; G01N 2001/066
USPC ........................... 83/72, 76, 370, 367
See application file for complete search history.

(56) References Cited

U.S. PATENT DOCUMENTS

| | | | |
|---|---|---|---|
| 3,884,563 A | 5/1975 | Evans et al. | |
| 3,926,085 A * | 12/1975 | Shatzel | G01N 1/06 74/125.5 |
| 6,598,507 B1 | 7/2003 | Günther et al. | |
| 7,168,901 B2 | 1/2007 | Ranner | |
| 8,353,232 B2 * | 1/2013 | Walter | G01N 1/06 83/13 |
| 8,640,585 B2 | 2/2014 | Züst et al. | |
| 10,571,368 B2 * | 2/2020 | Zhang | G01N 35/00009 |
| 10,724,929 B2 * | 7/2020 | Zhang | G01N 1/2813 |
| 2009/0241751 A1 | 10/2009 | Walter | |
| 2013/0166072 A1 * | 6/2013 | Yang | G05B 15/02 83/403.1 |

(Continued)

FOREIGN PATENT DOCUMENTS

| | | |
|---|---|---|
| CN | 201069415 Y | 6/2008 |
| CN | 205280408 U | 6/2016 |

*Primary Examiner* — Nhat Chieu Q Do
(74) *Attorney, Agent, or Firm* — Hodgson Russ LLP

(57) ABSTRACT

The disclosure relates to a microtome having a cutting knife, an object holder mounted on a slide, the slide being movable relative to the cutting knife in a cutting direction and in a thickness defining direction, movement of the slide in the thickness defining direction being performed by a first electric motor controlled by a control unit, movement of the slide in the cutting direction being performed by a second electric motor controlled by the control unit, wherein the control unit is configured to control the movement of the slide in the thickness defining direction and in the cutting direction.

11 Claims, 2 Drawing Sheets

(56) References Cited

U.S. PATENT DOCUMENTS

2016/0245728 A1* 8/2016 Walter .................. G01N 1/286
2018/0136090 A1* 5/2018 Bui ......................... B26D 7/27

* cited by examiner

CONTROLLING A MOTORIZED MICROTOME

CROSS-REFERENCE TO RELATED APPLICATIONS

The present application is a national phase entry under 35 USC § 371 of International Application PCT/CN2017/113802, filed Nov. 30, 2017, the entire disclosure of which is incorporated herein by reference.

FIELD

The present disclosure relates to a microtome having a control unit for controlling motorized functions of the microtome.

BACKGROUND

The present disclosure lies in the field of microtomes for producing thin sections, in which the cutting operation is performed by way of a relative movement between a cutting knife and an object. A drive system having a drive motor, a control unit, and a manually operation device such as a handwheel can be provided to generate the relative movement.

Microtomes are increasingly being automated in order to minimize the continuous stress on the operator and at the same time to ensure simplified handling. In addition, the throughput of specimens to be sectioned is increased with a correspondingly automated microtome. In automated microtomes, for example, developments have included not only automatically feeding the object onto the cutting knife, but additionally equipping the drive system with a motor that generates a relative cutting movement between the object and the cutting knife.

Such a microtome of a disc type is depicted and described, for example, in WO 98/04898 A1.

A rotary microtome generally includes an object carriage. The object carriage carries a specimen holder that holds a specimen to be cut. The object carriage is moved up and down in a vertical path on the rotary microtome. During this vertical movement, the specimen is passed over a knife or cutter fixedly arranged on the rotary microtome. In rotary microtomes, control of the vertical cutting movement can take place by means of a crank mechanism which is driven by a handwheel. The crank mechanism transforms turning movement of the handwheel into vertical movement of the object carriage.

U.S. Pat. No. 6,598,507 B1 discloses such a rotary microtome for producing thin sections, in which the cutting operation is performed by way of a relative movement between a cutting knife and an object. A drive system having a drive motor, a control unit, and a handwheel is provided to generate the relative cutting movement. The handwheel is connected to an encoder that delivers corresponding signals to the control unit upon rotation of the handwheel. The drive motor is then activated accordingly by way of said control unit. In the absence of encoder signals, the drive system is locked.

U.S. Pat. No. 8,640,585 B2 discloses an apparatus for producing multiple images of a specimen, having a sliding microtome. The specimen is secured in a specimen holder, movably in a plane. A knife having a cutting edge is arranged above the specimen that is movable along a cutting direction. Provided on the side opposite the cutting edge of the knife is a microscope having a camera for acquiring a respective image of the just-produced cut surface of the specimen.

U.S. Pat. No. 3,884,563 describes a microtome apparatus in which thin serial sections of organic material are cut from a stained and frozen specimen advancing into a rotating knife, so as to permit motion picture gross, micro- or macrophotography of a cross-section of the specimen. A refrigerated and insulated housing maintains the specimen in frozen condition during sectioning and filming. The apparatus enables the production of better quality films in shorter times than were possible with previous cine-microtome designs. The films are useful as diagnostic, research and educational tools in the areas of medicine, life science and ecology.

SUMMARY

According to the disclosure, a microtome with the features of claim 1 is proposed. Advantageous further developments form the subject matter of the dependent claims and of the subsequent description.

According to first aspect of the disclosure, it is proposed a microtome having a cutting knife, an object holder mounted on a slide, the slide being movable relative to the cutting knife in a cutting direction and in a thickness defining direction, and a control unit. Movement of the slide in the thickness defining direction is performed by a first electric motor controlled by the control unit, movement of the slide in the cutting direction is performed by a second electric motor controlled by the control unit, wherein the control unit is configured to control the movement of the slide in the thickness defining direction and in the cutting direction.

Preferably, the control unit is configured to trigger image taking after a section. This allows e.g. for generating a 3D reconstruction of a specimen, wherein a picture of the specimen is taken after each one or more sections. For this, it is of importance that the position of the specimen is more or less identical when the picture is taken.

Preferably, the slide is moved in the thickness defining direction as a function of rotation of a first handwheel. Thus allows for an exact manual control of the movement.

Advantageously, the first handwheel is coupled to the slide via an electric drive train comprising an encoder for monitoring the rotation of the handwheel and a first electric motor for moving the slide in the thickness defining direction as a function of the rotation of the handwheel. By this, there is no mechanical coupling between the handwheel and the slide movement, so that slide movement in the thickness defining direction can be performed easily via the first electric motor.

Advantageously, the control unit is configured to provide a memory position, and to move the slide in the thickness defining direction into the memory position in reaction to a corresponding command. By this, the slide and in turn the object can be moved away from the knife to a predetermined position for performing there further functions.

Advantageously, the control unit is configured to store and/or clear the memory position in reaction to a corresponding command, e.g. buttons. By this, the memory position can be set very easily by the user.

Advantageously, the control unit is configured to control the first electric motor to rotate in at least three different speeds. By this, the movement of the slide forward and backward relative to the knife can be controlled very precisely.

Advantageously, the slide is moved in the cutting direction as a function of rotation of a second handwheel. Thus allows for an exact manual control of the movement.

Advantageously, the second handwheel is coupled to the slide via a mechanical drive train. By this, there is a mechanical coupling between the handwheel and the slide cutting movement, so that the user has always full control over the cutting movement.

Additionally, the slide is moved in the cutting direction by a second electric motor controlled by the control unit. This allows for automatic use of the microtome, e.g. for generating multiple sections of one specimen, e.g. for generating a 3D reconstruction. For this, the control unit is preferably configured to trigger image taking after a section.

Advantageously, the microtome comprises an electrically operable clutch between the second electric motor and the slide, and the clutch is controlled by the control unit. By this, the connection between the slide and the second electric motor can easily be established or separated.

Advantageously, the control unit is configured to open and/or close the clutch in reaction to a brake command. By this, the connection between the slide and the second electric motor can easily be established or separated by a user. a closed clutch works as a brake for the handwheel.

Further advantages and embodiments of the disclosure will become apparent from the description and the appended figures.

It should be noted that the previously mentioned features and the features to be further described in the following are usable not only in the respectively indicated combination, but also in further combinations or taken alone, without departing from the scope of the present disclosure.

DETAILED DESCRIPTION

The disclosure will be explained in more detail with reference to a preferred exemplary embodiment with the aid of the schematic drawings.

Figure 1:
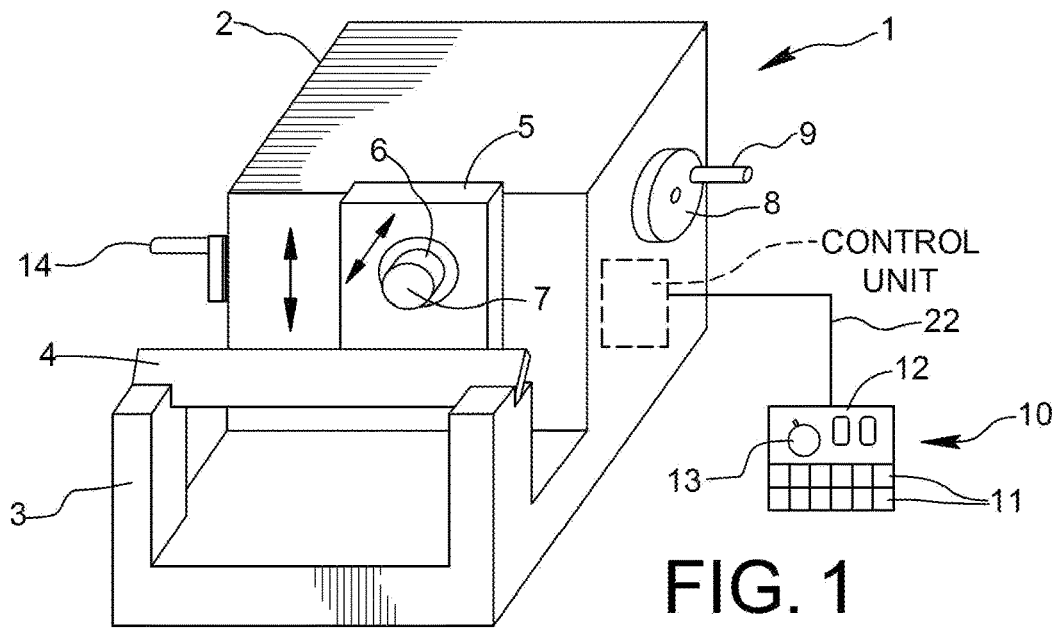
FIG. 1 is a perspective view of the microtome with a handwheel and an externally arranged control panel.

FIG. 1 shows a microtome 1 having a microtome housing 2 and a knife holder 3 to receive a cutting knife 4. An object 7 is arranged on an object holder 6 that is mounted on a slide 5 so that it is movable in the direction of the double arrow. A manually operation device in form of a rotatably mounted handwheel 8 having a handle 9 is arranged on microtome 1. Rotation of handwheel 8 causes object slide 5 to move up and down and causes object 7 to be guided over the edge of knife 4.

Figure 5:
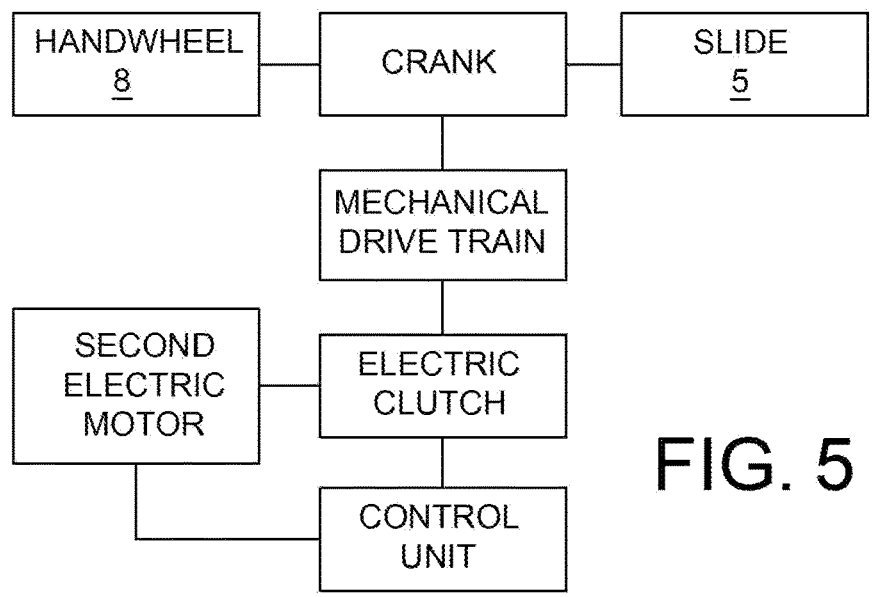
FIG. 5 is a schematic diagram of a mechanical drive train connecting a handwheel and a slide.

Handwheel 8 can be connected to slide 5 by way of a mechanical drive train (shown in FIG. 5) such as a crank drive (cf. U.S. Pat. No. 5,065,657). Handwheel 8 can be fixedly secured to the crank of the crank drive so that by rotating handwheel 8 the crank of the crank drive is rotated.

For motorized up and down movement of the slide 5, the crank of the crank drive is further connected to an electric motor via a mechanical drive train such as a belt drive, i.e. a rotating shaft of the electric motor is connected via a belt with a pulley or the like, the pulley being connected (or connectable via a clutch) with the crank of the crank drive.

The electric motor for up and down movement (i.e. in the cutting direction) is controlled by a control unit (inside housing 2). The control unit can be connected to an external control panel 10. Control panel 10 has a keypad 11 for numerical inputs, a rotary controller 13 for continuously variable inputs, and switches 12 for inputting specific switch positions and operating states.

Preferably, an electrically operable clutch is disposed between the electric motor and the mechanical drive train (here between the pulley and the crank). The electric operable clutch can be controlled by the control unit. When the clutch is open, the crank can be rotated manually by the handwheel 8 without being hindered by the electric motor. When the clutch is closed, the crank can be rotated by the electric motor.

Furthermore, providing an electrically operable clutch between the electric motor and the mechanical drive train for the up and down movement allows for a very simple braking of the up and down movement. In case the clutch is closed, manually rotating the handwheel 8 is hindered by the electric motor. A corresponding brake button for closing the clutch can be arranged on the control panel 10 or on the housing 2. Furthermore, the control unit can be configured to automatically close the clutch after each section when the slide 5 reaches a lowermost position.

Additionally, the slide 5 can be moved forward and backward. Usually, the slide is moved backward after the section so that the object does not contact the knife during moving up, and the slide is moved forward before the next section in order to adjust the thickness. A manually operation device in form of a rotatably mounted handwheel 14 having a handle is arranged on microtome 1. Rotation of handwheel 14 causes slide 5 to move forward and backward (i.e. in the thickness defining direction).

Figure 4:
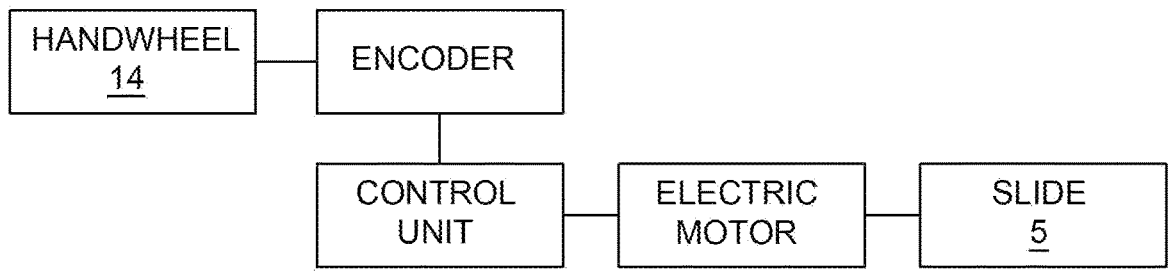
FIG. 4 is a schematic diagram of an electric drive train connecting a handwheel and a slide.

Essentially, handwheel 14 can be connected to slide 5 by way of a mechanical drive train such as a crank drive (cf. U.S. Pat. No. 5,065,657). However, according to a preferred embodiment of the disclosure, the handwheel 14 is not coupled to the slide 5 via a mechanical drive train but via an electric drive train (shown in FIG. 4) comprising an additional electric drive motor. The electric drive motor for forward and backward movement of the slide 5 (i.e. in the thickness defining direction) is also controlled by the control unit (inside housing 2). This is provided by an encoder which converts the rotation of the handwheel 14 into corresponding signals and forwards them to the control unit. In the control unit, the signals are analyzed, and the drive motor is activated accordingly. It is thus possible, with this configuration, to continue to operate the drive system in the accustomed sensitive fashion. This is especially advantageous in particular when, following a specimen change or knife change, the two need to be realigned with each other. By way of slight handwheel movements, the drive system can thus be moved sensitively forward and backward. In addition, by means of the control unit, a reliable locking of the drive system can be effected whenever no signals are being supplied from the encoder. In this standby mode, the operator performs actions on the microtome, and there is a considerable risk of injury on the cutting knife. This risk of injury is minimized by automatic locking of the drive system.

Moving the slide 5 forward and backward by electric motor further provides the possibility according to a preferred embodiment of the disclosure to define a memory position for the slide 5 into which the slide 5 can be moved automatically in reaction of a corresponding command, e.g. by pushing a memory button on the control panel 10. It has to be stressed that this memory position is a position horizontally apart from the knife, i.e. slide 5 has to move horizontally to reach the memory position. The memory position can be set and cleared in reaction of a corresponding command, e.g. using the control panel 10. Additionally, a home position or default position can be defined which is a position being most horizontally apart from the knife.

Furthermore, moving the slide 5 forward and backward by electric motor further provides the possibility according to a preferred embodiment of the disclosure to define different movement speeds. Especially, at least three different movement speeds can be provided, a first movement speed (so called low speed), a second movement speed (so called medium speed), and a third movement speed (so called high speed). E.g. low speed can be 0.5 mm/s, e.g. for moving object head forward and backward; medium speed can be 1 mm/s, e.g. for moving object head forward, and high speed can be 2 mm/s, for moving object head to home position or memory position.

Figure 2:
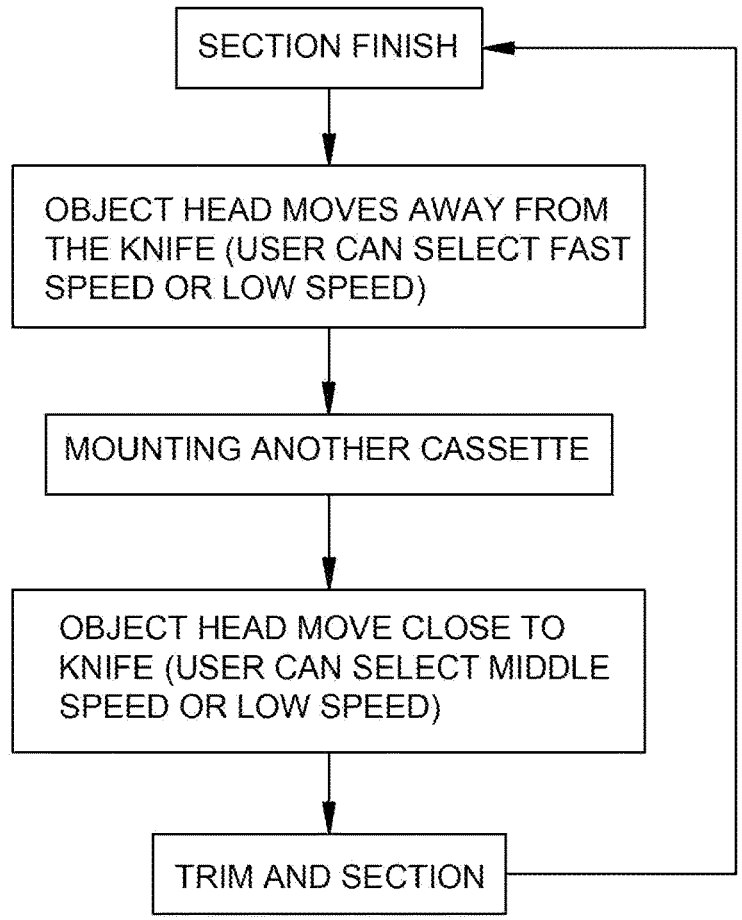
FIG. 2 is a schematic diagram illustrating different speeds for horizontal movement of the object.

An exemplary embodiment showing the advantages using different speeds is shown in FIG. 2. When a section is finished, the slide must be moved backward in order to ensure that the object does not touch the knife while being moved up. This backward movement can be accomplished either in low speed or in fast speed (high speed). Low speed can be used if the object shall not be changed and the actual position of the slide shall be known very exactly. Fast speed can be used when the object is to be changed so that an exact knowledge of the slide position is not important.

Then, the slide is moved up. Then, e.g. the object can be changed by mounting a new object cassette, an image of the object can be taken and/or a new section can be started.

Before the new section can be performed, the slide 5 having the object fixed to it must be moved forward so that the object will be cut by the knife when moving down again. This forward movement can be accomplished either in low speed or in medium speed (middle speed). Low speed can be used if the object was moved backwards in low speed and the distance between the object and the knife was only short. Medium speed can be used if the object was moved to the home position and/or changed and the distance between the object and the knife was high.

In this context, one or both of the drive motors can be configured as a stepper motor, or as a DC motor, especially a BLDC (brush less DC) motor.

Figure 3:
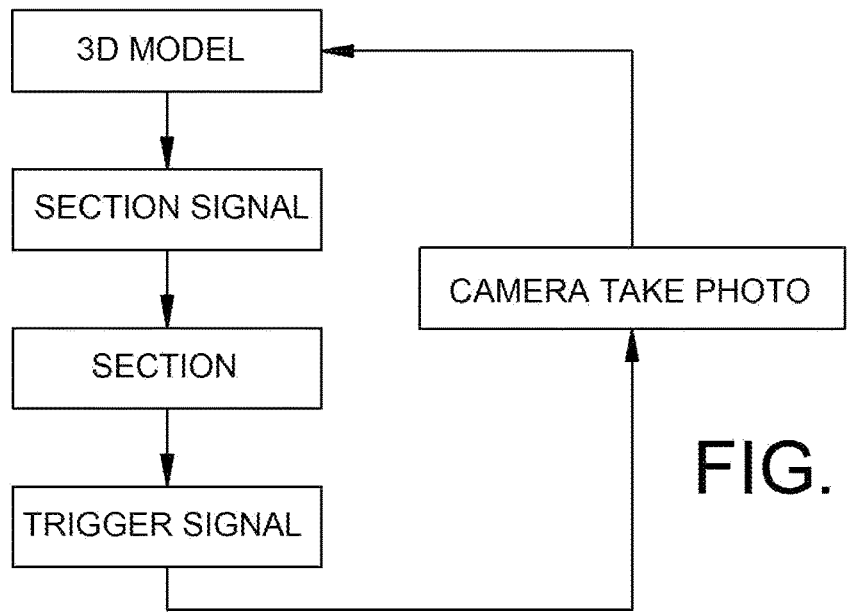
FIG. 3 is a schematic diagram illustrating 3D reconstruction mode.

Furthermore, according to a preferred embodiment of the disclosure, the control unit is configured to trigger image taking after a section. This can be preferably used for taking multiple images in a row, e.g. in order to perform a 3D reconstruction function as shown in FIG. 3. This is a function to reconstruct 3D model of specimen. When 3D mode is entered, control unit controls the microtome (especially the electric motors and the clutch) to cut specimen for one section, then moves the slide into an image taking position, especially the memory position mentioned above, then stops and sends a relay signal to an external camera. The camera gets the relay signal and takes a picture, then sends a feedback relay signal to microtome to trigger the second section.

This all can be done by a control unit of a microtome according to a preferred embodiment of the disclosure, because the control unit can control up and down movement of the slide as well as forwards and backwards movement of the slide, can move the slide with the specimen into the memory position and can and trigger the image acquisition.

What is claimed is:

1. A microtome having:
   a cutting knife,
   an object holder mounted on a slide, the slide being movable relative to the cutting knife in a cutting direction and in a thickness defining direction,
   a first electric motor controlled by a control unit performing the movement of the slide in the thickness defining direction,
   a second electric motor controlled by the control unit performing the movement of the slide in the cutting direction,
   wherein the control unit is configured to control the movement of the slide in the thickness defining direction and in the cutting direction,
   wherein the control unit is configured to store and/or clear the memory position in reaction to another corresponding command,
   wherein the memory position is a position horizontally apart from the cutting knife,
   wherein the slide is moved in the thickness defining direction as a function of rotation of a first handwheel, and
   wherein the slide is moved in the cutting direction as a function of rotation of a second handwheel.

2. The microtome according to claim 1, wherein the first handwheel is coupled to the slide via an electric drive train comprising an encoder for monitoring the rotation of the first handwheel and the first electric motor for moving the slide in the thickness defining direction as a function of the rotation of the first handwheel.

3. The microtome according to claim 1, wherein the control unit is configured to control the first electric motor to rotate in at least three different speeds.

4. The microtome according to claim 1, wherein the second handwheel is coupled to the slide via a mechanical drive train.

5. The microtome according to claim 1, wherein the microtome comprises an electrically operable clutch between the second electric motor and the slide, and the clutch is controlled by the control unit.

6. The microtome according to claim 5, wherein the control unit is configured to open and/or close the clutch in reaction to a brake command.

7. The microtome according to claim 1, further having a control panel, wherein the control unit is connected to the control panel, and the control panel has a keypad for numerical inputs, a rotary controller for continuously variable inputs, and switches for inputting specific switch positions and operating states.

8. The microtome according to claim 1, wherein one or both of the first electric motor and the second electric motor are configured as a stepper motor, or as a DC motor.

9. A microtome having:
   a cutting knife,
   an object holder mounted on a slide, the slide being movable relative to the cutting knife in a cutting direction and in a thickness defining direction,
   a first electric motor controlled by a control unit performing the movement of the slide in the thickness defining direction, a second electric motor controlled by the control unit performing the movement of the slide in the cutting direction, wherein the control unit is configured to control the movement of the slide in the thickness defining direction and in the cutting direction, wherein the control unit is configured to send a relay signal after a section is cut, wherein the relay signal triggers an external camera connected to the microtome to take an object image, wherein the slide is moved in the thickness defining direction as a function of rotation of a first handwheel, and wherein the slide is moved in the cutting direction as a function of rotation of a second handwheel.

10. The microtome according to claim 9, wherein the control unit is configured to provide a memory position, and to move the slide in the thickness defining direction into the memory position in reaction to a corresponding command.

11. The microtome according to claim 9, wherein the control unit is configured to control the first electric motor to rotate in at least three different speeds.

* * * * *